US Patent 3,371,031
Patented Feb. 27, 1968

3,371,031
OXIDATION OF MERCAPTO COMPOUNDS
James R. Strong, Evanston, Ill., assignor to Universal Oil Products Company, Des Plaines, Ill., a corporation of Delaware
No Drawing. Continuation-in-part of application Ser. No. 422,418, Dec. 30, 1964. This application Mar. 2, 1967, Ser. No. 619,967
10 Claims. (Cl. 208—207)

ABSTRACT OF THE DISCLOSURE

An alkali-alcohol solution utilized in a process for oxidizing mercapto compounds contained in a sour hydrocarbon distillate is subsequently treated with an adsorbent, such as, activated charcoal, fuller's earth, activated alumina, magnesia, etc. to remove surface-active, catalyst-deactivating impurities from the solution.

The process employs the alkali-alcohol solution in mixture with the sour distillate and an oxidizing agent as the reactants that are brought into contact with a phthalocyanine catalyst in the conversion zone; the effluent from the conversion zone is separated into a hydrocarbon phase which is then treated before recycling it for further use.

Cross references to related applications

This application is a continuation-in-part of my copending application, Ser. No. 422,418, filed Dec. 30, 1964, and now abandoned.

Disclosure

The subject of the present invention is an improvement in a process for the oxidation of mercapto compounds contained in a sour hydrocarbon distillate (referred to herein as a "sweetening process"). The concept of the present invention resulted from my recognition that certain surface-active materials, originally present in the sour distillate, accumulate in an alkali-alcohol solution utilized in the process and deactivate the catalyst used therein. Coupled with this observation, was my discovery that these deleterious, surface-active materials are easily removed by contacting at least a portion of the alkali-alcohol solution with a solid adsorbent. Therefore, the present invention comprises a combination process involving a mercapto compound oxidation step and a alkali-alcohol solution purification step. Taken together, these steps result in an improved sweetening process having greater catalyst stability and allowing more efficient utilization of an alkali-alcohol solution.

A widely used process for the oxidation of mercapto compounds (i.e. mercaptans, thiophenols, and salts thereof) utilizes a phthalocyanine catalyst. In most cases this catalyst is found to be very effective and extremely stable—especially in the oxidation of comparatively low molecular weight mercapto compounds and those of primary and secondary configurations. Some difficulty is, however, experienced when this catalyst is used for the treatment of sour distillates containing high molecular weight mercapto compounds, tertiary mercapto compounds, and poly-functional mercapto compounds. I have now found that this difficulty is, at least in part, due to the presence of surface-active materials in these sour distillates. These surface-active materials are, in the main, higher molecular weight aliphatic and naphthenic acids and phenolic materials. Typical of the toxin-acting acids are: carboxylic acids such as lauric acid, tridecanoic acid, myristic acid, and naphthenic acids such as cyclohexanecarboxylic acid, 1,2-cyclohexanedicarboxylic acid, etc. Representative of the phenolic materials are: phenol, the cresols, the aminophenols, the xylenoles, the alkyl phenols, the phenolsulfonic acids, the naphthols, etc.

Without the intention of unduly restricting my invention by this explanation, I believe that, in the presence of an alkaline reagent, these surface-active materials (or salts thereof) are attracted to the surface of the phthalocyanine catalysts where they constitute a barrier to the approach of mercaptide anions, which is believed to be an essential step in the chemistry of the over-all oxidation reaction. In addition, these surface-active materials interfere with the formation of the mercaptide anions—apparently, by collecting at the hydrocarbon-alkali interface in the conversion zone.

The deleterious effect of these surface-active materials tends to be particularly acute when the alkaline solution is continuously recycled for further use in the process. For higher-boiling sour streams, this alkaline solution typically contains a mercapto compound solubility-increasing agent such as an alcohol, and the economics of the resultant process make it imperative that at least a part of this alkali-alcohol solution be recycled. In view of the necessity of recycling, it is apparent that even the sweetening of hydrocarbon distillates of relatively low concentration of surface-active materials can result in a substantial accumulation of these materials in the alkali-alcohol solution utilized in the process.

Considering the nature of these surface-active toxins, I have now found that they are removed from the recycled alkali-alcohol by contacting at least a portion of the recycled stream with a suitable adsorbent material, as will be discussed hereinafter in detail. As a consequence of this removal, a marked feature of the resultant process is the improved activity stability of the phthalocyanine catalyst.

It is, accordingly, an object of the present invention to improve the activity stability of a phthalocyanine catalyst employed in sweetening service. Another object of the present invention is to provide a means of purification of an alkali-alcohol solution so that it can be continuously utilized in the sweetening of sour distillates. Yet another object is to improve a sweetening process, utilizing a solid bed of a phthalocyanine composite in conjunction with an alkali-alcohol solution, in order to substantially prevent catalyst deactivation by surface-active materials.

In one broad embodiment, the present invention comprehends an improvement in a process for the oxidation of mercapto compounds contained in a sour hydrocarbon distillate. In this process the distillate, an alkali-alcohol solution, and an oxidizing agent are contacted, in a conversion zone, with a phthalocyanine catalyst at oxidizing conditions. The effluent from the conversion zone is, thereafter, separated into a treated hydrocarbon distillate phase and a substantially mercapto compound-free, alkali-alcohol phase. At least a portion of this alkali-alcohol phase is then recycled to the conversion zone for further use therein. Accumulating surface-active, phthalocyanine catalyst-deactivating materials from the sour hydrocarbon distillate, the alkali-alcohol solution eventually deactivates the catalyst. Recognizing the deleterious nature of these surface-active materials, the present invention provides the improvement of contacting at least a portion of the alkali-alcohol solution being recycled to the conversion zone with a solid adsorbent, thereby adsorbing a substantial portion of these deleterious, surface-active materials and substantially preventing this source of catalyst deactivation.

Other embodiments and objects of the present invention encompass: various kinds of sour hydrocarbon distillates, particularly preferred phthalocyanine catalysts, types of alkali-alcohol solutions, suitable adsorbent materials, and the like, all of which are hereinafter disclosed in the discussion of each of these facets of the present invention.

The improved process of the present invention is especially advantageously used in the oxidation treatment of heavier hydrocarbon distillates containing mercapto compounds, including particularly kerosenes and jet fuels. Other heavy hydrocarbon distillates include solvent oils, diesel fuels, fuel oils, lubricating oils, etc. These heavier hydrocarbon oils generally contain difficulty oxidizable mercaptans and also contain surface-active impurities which deactivate the catalyst. While the present process is particularly applicable to the oxidation treatment of the heavier hydrocarbon distillates, it is understood that the process also may be used for the oxidation treatment of other mercapto compound-containing streams including: concentrated mercapto fractions, normally gaseous hydrocarbon fractions containing mercapto compounds, sour gasolines, sour naphthas, etc.

As hereinbefore set forth, a phthalocyanine catalyst is used in the present invention. Any suitable phthalocyanine catalyst may be used and preferably comprises a metal phthalocyanine. Particularly preferred metal phthalocyanines include cobalt phthalocyanine and vanadium phthalocyanine. Other metal phthalocyanines include iron phthalocyanine, copper phthalocyanine, nickel phthalocyanine, chromium phthalocyanine, etc. The metal phthalocyanine, in general, is not readily soluble in aqueous solvents, and, therefore, for use in an aqueous alkaline solution or for ease of compositing with a solid carrier, a derivative of the phthalocyanine is preferred. A particularly preferred derivative is the sulfonated derivative. Thus, an especially preferred phthalocyanine catalyst is cobalt phthalocyanine sulfonate. Such a catalyst comprises cobalt phthalocyanine disulfonate and also contains cobalt phthalocyanine monosulfonate. Another preferred catalyst comprises vanadium phthalocyanine sulfonate. These compounds may be obtained from any source or prepared in any suitable manner as, for example, by reacting cobalt vanadium phthalocyanine with 25–50% fuming sulfuric acid. While the sulfonic acid derivative is preferred, it is understood that other suitable polar derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

In a preferred embodiment the catalyst is employed as a fixed bed in the oxidation zone and, accordingly, the catalyst is prepared as a composite with a solid support. Any suitable support may be employed and preferably comprises activated charcoal, coke or other suitable forms of carbon. In some cases the support may comprise silica, alumina, magnesia, etc., or mixtures thereof. The solid catalyst is prepared in any suitable manner. In one method, preformed particles of the solid support are soaked in a solution containing the phthalocyanine catalyst, after which excess solution is drained off and the catalyst is used as such, or is subjected to a drying treatment such as mild heating, blowing with air, hydrogen, nitrogen, etc., or successive treatments using two or more of these treatments prior to use in the oxidation. In other methods of preparing the solid composite, a solution of the phthalocyanine catalyst may be sprayed or poured over the particles of the solid support, or such particles may be dipped, suspended, immersed or otherwise contacted with the catalyst solution. The concentration of phthalocyanine catalyst in the composite may range from 0.05% to 10% by weight or more of the composite, with a preferred value of from about .01% to about 1.0%.

According to the present invention, the oxidation is effected in the presence of an alkali-alcohol solution. Any suitable alkaline reagent is employed. A preferred alkaline reagent comprises sodium hydroxide (caustic) or potassium hydroxide. Other alkaline reagents include lithium hydroxide, rubidium hydroxide, cesium hydroxide, etc., although, in general, these hydroxides are more expensive and therefore are not preferred for commercial use. Preferred alkaline solutions are from about 1% to about 50% and more particularly from about 5% to about 25% by weight concentration of sodium hydroxide or potassium hydroxide in water.

Any mercapto compound solubility-increasing alcohol is used and preferably comprises methanol. Other alcohols include ethanol, propanol, butanol, etc. The alcohol is used in a concentration of from about 2% to about 50% and preferably from about 5% to about 30% by weight of the resultant alkali-alcohol solution.

Depending on the nature and concentartion of the mercapto compounds contained in the sour distillate, the ratio of the volume of alkali-alcohol solution to the volume of the sour distillate can be selected from a wide range. The objective is to achieve intimate contact between the two phases and transference of the mercapto compounds from the oil phase to the alkali phase. Ordinarily a volumetric ratio of from about 0.05 to about 1.0 gives good results, although a higher ratio can be utilized if desired.

While the process of the present invention is particularly useful when the oxidation is effected in the presence of alkali-alcohol solution, it is understood that the present invention also may be used for sweetening effected in the presence of aqueous alkaline solutions containing other mercapto compound solubility-increasing agents such as ammonium hydroxide, sodium isobutynate, dimethyl sulfoxide, etc.

As hereinbefore set forth, sweetening of the sour hydrocarbon distillate is effected by oxidation of mercapto compounds. Accordingly, an oxidizing agent is used in the process. Oxygen is particularly preferred. Air or other oxygen-containing gases may be advantageously used. Although not preferred, iodine, ferric chloride, lead peroxide, hydrogen peroxide, and other well-known oxidizing agents, may in some cases, be utilized to effect the desired oxidation. Oxygen is preferably utilized in at least the stoichiometric amount necessary to oxidize the mercapto compounds.

Oxidation of the mercapto compound is effected in any suitable manner. In general, the oxidation is effected at a temperature of from ambient to about 210° F. when operating at atmospheric pressure, or when desired, a higher temperature which may range up to about 400° F. or more when operating at superatmospheric pressure. Usually it is preferred to utilize a temperature within the range of from about 50° F. to about 150° F. Atmospheric or superatmospheric pressure which may range up to 1000 pounds or more may be used.

The time of contact of the reactants with the catalyst can generally be adjusted to produce the desired level of sweetening and may range within wide limits depending on the nature and concentration of the mercapto compounds, the viscosity and temperature of the sour distillate, the accumulated life of the catalyst, and the like. In general, this is not a critical parameter and may be selected from a wide range of the order of about minutes to 1 hour or more.

Additional details as to the sweetening step of the process of the present invention are given in U.S. Patent No. 2,988,500 and 3,108,081.

In a preferred embodiment, the catalyst is disposed as a fixed bed in a conversion zone and the sour hydrocarbon distillate, air and alkali-alcohol solution are passed, at the desired temperature and pressure, into contact with the catalyst in either upward, downward, or radial flow. The reaction mixture from the conversion zone is passed into a separating zone. Excess air is vented from the separating zone and a treated distillate phase separates from an alkali-alcohol phase.

At this point, it is important to note that this alkali-alcohol phase is essentially mercaptide-free, because of the effectiveness of the phthalocyanine catalyst. Accordingly, the prior art, being concerned solely with mercaptide solubilizing capabilities of this alkali-alcohol phase and being ignorant of the adverse affect of accumulated surface-active materials, on a phthalocyanine catalyst, would teach the immediate reuse of this phase in the conversion zone. According to the present invention, it is necessary to further purify this alkali-alcohol stream before recycling it to the conversion zone, for the reasons previously enumerated.

Hence, the alkali-alcohol phase is separately withdrawn from the separating zone, and in accordance with the present invention, is passed into contact with a solid adsorbent.

Any suitable solid adsorbent is used and preferably comprises activated charcoal, coke, or other suitable forms of carbon. Other solid adsorbent materials which may be utilized with good results include the various charcoals produced by the destructive distillation of wood, peat, lignite, nut shells, bones and other carbonaceous materials, and preferably such charcoals as have been heat-treated, chemically treated, etc., to form a highly porous structure of increased adsorbent capacity. Also included are the naturally occurring clays and silicates: for example, diatomaceous earth (frequently called "siliceous earth"), diatomaceous silicate, kieselguhr, fuller's earth, attapulgus clay, feldspar, montmorillonite, halloysite, kaoline, and the like. In addition refractory inorganic oxides, are in some cases, advantageously employed, such as bauxite activated alumina, and activated magnesia. Mixtures of adsorbent materials may also be used if desired.

In some cases, the solid adsorbent is disposed as a fixed bed in a contacting zone and the alkali-alcohol solution is passed therethrough, in either upward, downward, or radial flow—downward usually being preferred. The contacting is effected at any suitable temperature which may range from ambient to about 200° F., when employing atmospheric pressure, or to a higher temperature which may range up to 400° F., when utilizing superatmospheric pressure. The pressure used may range from atmospheric up to 1000 p.s.i.g. or more with about atmospheric to about 100 p.s.i.g. being preferred.

In general, the amount of the adsorbent utilized will be sufficient to remove a substantial portion of the surface active materials from the alkali-alcohol solution. Excellent results are obtained with the preferred charcoal adsorbents when from about 0.01 to about 100 pounds of charcoal are used per pound of alkali-alcohol treated per hour. However, the exact value to be used in practice is such a strong function of the type of adsorbent utilized and the nature of the surface-active materials, that it is conveniently determined in most cases by suitable experimentation familiar to those skilled in the art.

Regarding the adsorption step of the process of the present invention, it should be noted that it takes place in the absence of an added oxidizing agent and is, therefore, not a purification step that proceeds via a chemical transformation. Rather it is simply a physical adsorption of surface-active materials on the surface of the adsorbent material.

During the treatment with the solid adsorbent, surface-active impurities contained in the alkali-alcohol solution are substantially removed. The thus treated alkali-alcohol solution is returned to the conversion zone for further use in the oxidation of mercapto compounds. Treatment of the alkali-alcohol solution with the adsorbent is effected continuously or intermittently as desired. When the oxidation process is effected in a continuous manner, treatment of the alkali-alcohol solution with the adsorbent conveniently also is effected in continuous manner so as to accomplish optimum utilization of the alkali-alcohol solution. Ordinarily, it is preferable to treat the entire portion of the recycled solution; but a smaller portion sufficient to prevent build-up of surface-active materials, may be treated if desired.

When desired, two or more contacting zones are employed; in which case one or more contacting zones is used to treat the alkali-alcohol solution while the solid adsorbent in the other contacting zone is regenerated. Regeneration of the solid adsorbent is effected in any suitable manner. In one method, steam or hot water at a temperature above 100° F., or a mixture of these, are used to wash the impurities out of the adsorbent and to thereby regenerate the same for further use. In another method, any suitable solvent such as a strongly polar, non-aqueous substance like carbon tetrachloride is used to dissolve the impurities and remove them from the solid adsorbent with subsequent removal of the solvent by evaporation. Yet another method is to first acidify the adsorbent, water wash, and then wash with a suitable organic solvent such as carbon tetrachloride, acetone, etc.

While the solid adsorbent preferably is used as a fixed bed in a contacting zone as hereinbefore described, in another embodiment the solid adsorbent is used as a slurry in the alkali-alcohol solution and, after the desired contacting, the adsorbent is separately withdrawn from the solution by filtering or in any other suitable manner.

Regardless of which method is used, the treated alkali-alcohol solution is returned to the oxidation step of the process for further use therein. As hereinbefore set forth, this serves to maintain the high activity of the catalyst, as well as to permit extensive reuse of the alkali-alcohol solution in the process.

The following examples are introduced to illustrate further the novelty, utility, and mode of operation of the present invention but not with the intention of unduly restricting the present invention.

EXAMPLE I

A commercial sour kerosene, having a boiling range of from about 370° F. to about 510° F., a mercaptan sulfur content of 0.05% by weight and Saybolt color of 22, is subjected to sweetening by being passed, at a temperature of 115° F. and a pressure of 100 p.s.i.g., together with air and an equal volume of a caustic-methanol solution containing 10% by weight of sodium hydroxide and 10% by weight of methanol, upwardly through a fixed bed of catalyst comprising 1% by weight of cobalt pythalocyanine monosulfonate composited with activated charcoal. The reaction mixture is withdrawn from the upper portion of the sweetening zone and is passed into a settling zone. Excess air is vented from the upper portion of the settling zone. The sweetened kerosene is separately withdrawn as the product of the process and washed with water to remove entrained caustic. The caustic-methanol solution is separately withdrawn and recycled for further use in the sweetening zone.

When the process is effected in the above manner, the mercaptan sulfur content of the kerosene is reduced to below 25 parts per million. However, as the process continues, the mercaptan sulfur content of the kerosene gradually increases to above about 30 parts per million.

In accordance with the present invention, the caustic-methanol solution, withdrawn from the settling zone, is thereafter passed, at a temperature of 100° F. and a pressure of 10 p.s.i.g., downwardly through a bed of activated charcoal disposed in a contacting zone. It is important to note that this treatment is carried out in the absence of an added oxidizing agent. This treatment serves to remove, by adsorption, a substantial portion of surface-active impurities contained in the caustic-methanol solution. The caustic-methanol solution is withdrawn from the lower portion of the contacting zone and is returned to the sweetening zone for further use therein. This treatment maintains the activity of the phthalocyanine catalyst and allows the sustained production of a sweetened kerosene containing less than 25 parts per million by weight of mercaptan sulfur. Also, this treatment prevents discoloration of the sweetened kerosene and the sweetened kerosene has a Saybolt color of about 20. Regeneration of the bed of activated charcoal is performed periodically in order to remove the adsorbed materials.

EXAMPLE II

In an operation similar to that described in Example I, a sour jet fuel, having a boiling range of from about 207 to about 471° F. and a mercaptan sulfur content of 0.01%, is sweetened at a temperature of 125° F. and atmospheric pressure by being passed, together with air and an equal volume of an alkaline solution containing 6% by weight of potassium hydroxide and 8% by weight of methanol, into contact with a fixed bed of catalyst comprising 1% by weight of vanadium phthalocyanine sulfonate composited with activated charcoal. The products of the sweetening treatment are passed into a settling zone, wherefrom excess air is vented and wherein a sweetened jet fuel product, containing 9 p.p.m. mercaptan sulfur, is separated from a mercaptide-free, potassium hydroxide-methanol solution. The resultant potassium hydroxide-methanol solution is passed at ambient temperature and atmospheric pressure downwardly through a bed of activated charcoal, and the thus treated potassium hydroxide-methanol solution is continuously recycled to the sweetening step for further use therein. The process is operated in this fashion for a catalyst life of 1000 barrels of jet fuel per pound of active ingredient in the catalyst and no significant change in the activity of the catalyst is observed. Regeneration of the bed of activated charcoal is performed periodically by water washing and steaming the bed in order to remove adsorbed surface active materials.

I claim as my invention:

1. In a process for the oxidation of mercapto compounds contained in a sour hydrocarbon distillate in which said distillate, an alkali-alcohol solution and oxidizing agent are contacted in a conversion zone with a phthalocyanine catalyst at oxidizing conditions, wherein the effluent from said conversion zone is separated into a treated hydrocarbon distillate phase and a substantially mercapto compound-free, alkali-alcohol phase, wherein at least a portion of said alkali-alcohol phase is recycled to said conversion zone, and wherein said alkali-alcohol solution accumulates surface-active materials, originally present in said hydrocarbon distillate, having a deleterious effect on said phthalocyanine catalyst, the improvement which comprises contacting at least a portion of the alkali-alcohol phase being recycled to said conversion zone with a solid adsorbent, thereby adsorbing a substantial portion of said deleterious, surface-active materials.

2. The improved process of claim 1 further characterized in that said alkali-alcohol solution is a caustic-methanol solution.

3. The improved process of claim 1 further characterized in that said sour hydrocarbon distillate is a kerosene boiling range distillate.

4. The improved process of claim 1 further characterized in that said phthalocyanine catalyst comprises a sulfonated cobalt phthalocyanine, composited with a carbon carrier material.

5. The improved process of claim 1 further characterized in that said alkali-alcohol solution is a potassium hydroxide-methanol solution.

6. The improved process of claim 1 further characterized in that said phthalocyanine catalyst comprises sulfonated vanadium phthalocyanine composited with a carbon carrier material.

7. The improved process of claim 1 further characterized in that said solid adsorbent is activated charcoal.

8. The improved process of claim 1 further characterized in that said solid adsorbent is fuller's earth.

9. The improved process of claim 1 further characterized in that said solid adsorbent is activated alumina.

10. The improved process of claim 1 further characterized in that said solid adsorbent is magnesia.

References Cited

UNITED STATES PATENTS

| 2,794,767 | 6/1957 | Gleim et al. | 208—235 |
| 2,866,749 | 12/1958 | Shapiro | 208—207 |
| 2,921,020 | 1/1960 | Urban et al. | 208—206 |
| 2,976,229 | 3/1961 | Brown et al. | 208—207 |
| 3,260,665 | 7/1966 | Urban et al. | 208—206 |

FOREIGN PATENTS

| 760,543 | 10/1956 | Great Britain. |

DELBERT E. GANTZ, *Primary Examiner.*

G. J. CRASANAKIS, *Assistant Examiner.*